United States Patent
Li et al.

(10) Patent No.: US 11,208,984 B2
(45) Date of Patent: Dec. 28, 2021

(54) METHOD AND APPARATUS FOR CONTROLLING PITCH OF WIND TURBINE IN EXTREME TURBULENCE WIND CONDITIONS

(71) Applicant: XINJIANG GOLDWIND SCIENCE & TECHNOLOGY CO., LTD., Xinjiang (CN)

(72) Inventors: Yongming Li, Beijing (CN); Shuchun Zhao, Beijing (CN)

(73) Assignee: XINJIANG GOLD WIND SCIENCE & TECHNOLOGY CO., LTD., Xinjiang (CN)

( * ) Notice: Subject to any disclaimer, the term of this patent is extended or adjusted under 35 U.S.C. 154(b) by 664 days.

(21) Appl. No.: 16/090,173

(22) PCT Filed: Apr. 9, 2018

(86) PCT No.: PCT/CN2018/082372
§ 371 (c)(1),
(2) Date: Sep. 28, 2018

(87) PCT Pub. No.: WO2019/127975
PCT Pub. Date: Jul. 4, 2019

(65) Prior Publication Data
US 2021/0199087 A1 Jul. 1, 2021

(30) Foreign Application Priority Data
Dec. 28, 2017 (CN) .......................... 201711457552.5

(51) Int. Cl.
*F03D 9/00* (2016.01)
*H02P 9/04* (2006.01)
(Continued)

(52) U.S. Cl.
CPC .......... *F03D 7/0224* (2013.01); *F03D 7/046* (2013.01); *F05B 2270/328* (2013.01)

(58) Field of Classification Search
CPC ... F03D 7/0224; F03D 7/046; F05B 2270/328
See application file for complete search history.

(56) References Cited

U.S. PATENT DOCUMENTS

| 4,339,666 A * | 7/1982 | Patrick .................. F03D 7/0224 290/44 |
| 6,619,918 B1 * | 9/2003 | Rebsdorf ................ F03D 17/00 416/1 |

(Continued)

FOREIGN PATENT DOCUMENTS

| CN | 102168650 A | 8/2011 |
| CN | 103150473 A | 6/2013 |

(Continued)

OTHER PUBLICATIONS

First Office Action issued in corresponding Chinese Application No. 201711457552.5, dated Oct. 29, 2020, 10 pages.

(Continued)

*Primary Examiner* — Tulsidas C Patel
*Assistant Examiner* — Thomas K Quigley
(74) *Attorney, Agent, or Firm* — Bayes PLLC

(57) ABSTRACT

Provided are a method and an apparatus for controlling a pitch of a wind turbine under an extreme turbulence wind condition. The method includes: obtaining a first pitch parameter for a current time; obtaining a historical second pitch parameter in a predetermined time period before the current time; determining an updated threshold based on the obtained historical second pitch parameter; comparing the (Continued)

first pitch parameter for the current time with the determined updated threshold; and updating the first pitch parameter for the current time based on a result of the comparison.

16 Claims, 4 Drawing Sheets

(51) Int. Cl.
  *F03D 7/02* (2006.01)
  *F03D 7/04* (2006.01)

(56) References Cited

U.S. PATENT DOCUMENTS

| | | | |
|---|---|---|---|
| 7,351,033 B2 | 4/2008 | McNerney | |
| 10,605,228 B2* | 3/2020 | Evans | F03D 7/048 |
| 2003/0227174 A1 | 12/2003 | Bayly | |
| 2006/0002797 A1 | 1/2006 | Moroz et al. | |
| 2008/0001409 A1* | 1/2008 | Schellings | F03D 7/046 |
| | | | 290/44 |
| 2009/0295159 A1* | 12/2009 | Johnson | G05B 13/024 |
| | | | 290/44 |
| 2010/0040468 A1* | 2/2010 | Andersen | F03D 7/0264 |
| | | | 416/1 |
| 2010/0241280 A1 | 9/2010 | Garcia Barace et al. | |
| 2013/0161955 A1 | 6/2013 | Dalsgaard et al. | |
| 2014/0308125 A1 | 10/2014 | Stiesdal | |
| 2017/0328349 A1 | 11/2017 | Pan et al. | |

FOREIGN PATENT DOCUMENTS

| | | |
|---|---|---|
| CN | 103401273 A | 11/2013 |
| CN | 103410660 A | 11/2013 |
| CN | 105649876 A | 6/2016 |
| CN | 105756854 A | 7/2016 |
| CN | 106121914 A | 11/2016 |
| DK | 2915998 T3 | 2/2018 |
| EP | 1612414 A2 | 4/2006 |
| EP | 2915998 B1 | 2/2018 |
| EP | 3 524 810 A1 | 8/2019 |
| WO | 2003/104573 A3 | 12/2003 |
| WO | 2019/127975 A1 | 7/2019 |

OTHER PUBLICATIONS

International Search Report and Written Opinion in corresponding PCT Application No. PCT/CN2018/082372, dated Apr. 9, 2018, 9 pages.
Supplementary European Search Report issued in corresponding European Application No. EP 18 78 2868, dated Jul. 3, 2019, 7 pages.
Australian Examination Report No. 1 issued in corresponding Australian Application No. 2018241181, dated Jul. 3, 2019, 10 pages.

* cited by examiner

METHOD AND APPARATUS FOR CONTROLLING PITCH OF WIND TURBINE IN EXTREME TURBULENCE WIND CONDITIONS

The present application is a national phase of international application No. PCT/CN2018/082372 filed on Apr. 9, 2018, which claims the benefit of priority to Chinese Patent Application No. 201711457552.5, titled "METHOD AND APPARATUS FOR CONTROLLING PITCH OF WIND TURBINE IN EXTREME TURBULENCE WIND CONDITIONS," filed on 28 Dec. 2017 with the State Intellectual Property Office of People's Republic of China, both of which are incorporated herein by reference in their entirety.

TECHNICAL FIELD

The present disclosure relates to the field of wind power generation, and in particular, to a method and an apparatus for controlling a pitch of a wind turbine under an extreme turbulence wind condition.

BACKGROUND

As a clean and renewable energy source, wind energy has attracted more and more attention and the installed capacity of wind energy is increasing. With continuous development of wind power technology, various thorough researches are performed on wind turbines.

In a case that the wind turbine operates under an extreme turbulence wind condition, an ultimate load of the wind turbine is large, which may even influence the safe operation of the wind turbine. Therefore, how to control the wind turbine generator under the extreme turbulence wind condition to prevent an excessive ultimate load thereof is an urgent issue to be addressed.

SUMMARY

A method for controlling a pitch of a wind turbine under an extreme turbulence wind condition is provided according to an aspect of the present disclosure. The method includes: obtaining a first pitch parameter for a current time; obtaining historical second pitch parameters in a predetermined time period before the current time; determining an updated threshold based on the obtained historical second pitch parameters; comparing the first pitch parameter for the current time with the determined updated threshold; and updating the first pitch parameter for the current time based on a result of the comparison.

An apparatus for controlling a pitch of a wind turbine under an extreme turbulence wind condition is provided according to another aspect of the present disclosure. The apparatus comprises: a current parameter obtaining unit, configured to obtain a first pitch parameter for a current time; a historical parameter obtaining unit, configure to obtain historical second pitch parameters in a predetermined time period before the current time; a determination unit, configured to determine an updated threshold based on the obtained historical second pitch parameters; a comparison unit, configured to compare the first pitch parameter for the current time with the determined updated threshold; and an updating unit, configured to update the first pitch parameter for the current time based on a result of the comparison unit.

A system for controlling a pitch of a wind turbine under an extreme turbulence wind condition is provided according to another aspect of the present disclosure. The system comprises a processor, and a memory storing a computer program, wherein the computer program, when being executed by the processor, causes the processor to perform the aforementioned method.

A computer-readable storage medium storing a computer program is provided according to another aspect of the present disclosure. The computer program, when being executed, is for performing the aforementioned method.

According to the method, the apparatus and the system for controlling the pitch of the wind turbine in the present disclosure, the determination whether there is an extreme turbulence is not required. Therefore, a serious power loss caused by the inaccurate determination is avoided. An issue that there is an excessive ultimate load on components of the wind turbine due to a quick pitch adjustment under the extreme turbulence wind condition is effectively avoided, without influencing a pitch adjustment operation performed under a normal turbulence wind condition. A development cost of the wind turbine is reduced as well.

BRIEF DESCRIPTION OF THE DRAWINGS

For a clearer illustration of the technical solutions according to embodiments of the present disclosure, hereinafter the drawings for illustrating the embodiments of the present disclosure are briefly described.

DETAILED DESCRIPTION OF THE EMBODIMENTS

Hereinafter various embodiments are further described in detail in conjunction with the drawings.

It should be noted that an extreme turbulence wind condition and a normal turbulence wind condition mentioned in the embodiments of the present disclosure refer to wind conditions defined in the IEC standard.

Figure 1:
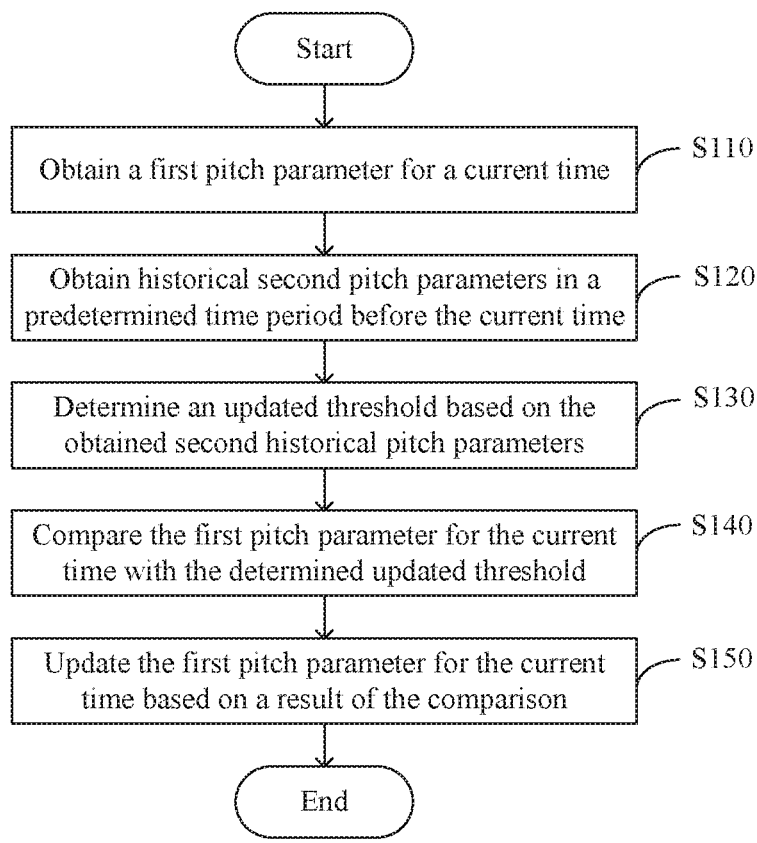
FIG. 1 is a flowchart of a method for controlling a pitch of a wind turbine according to an embodiment of the present disclosure.

FIG. 1 is a flowchart of a method for controlling a pitch of a wind turbine according to an embodiment of the present disclosure. The method includes steps S110 to S150.

In step S110, a first pitch parameter for a current time is obtained.

In step S120, historical second pitch parameters in a predetermined time period before the current time are obtained.

The pitch parameters (the first pitch parameter and the second pitch parameter) may include a pitch angle, a pitch rate, and the like. A pitch control system of the wind turbine generates in real time, based on information such as external wind speed and wind direction, the pitch parameters for controlling a pitch adjusting system to perform a subsequent pitch adjustment operation.

The historical second pitch parameters in the predetermined time period before the current time may represent the second pitch parameters generated at a time period before a moment when the first pitch parameter for the current time is generated or a time period before a moment when the step S110 is performed. For example, the historical second pitch parameters in the predetermined time period before the current time may be a historical second pitch parameters within 1 minute prior to the current moment (namely, the predetermined time period having a time length of one minute), or may be a historical second pitch parameters within 10 minute prior to the current moment (namely, the predetermined time period having a time length of ten minutes). The time length of the predetermined time period may be determined according to a type of the wind turbine, a real wind condition, or based on engineering experiences. Further, the historical second pitch parameters in the predetermined time period before the current time may represent a predetermined quantity of second pitch parameters which are generated prior to generating the first pitch parameter for the current time, in a case that the pitch parameters are periodically generated.

In some embodiments, the first pitch parameter and the second pitch parameter may be pitch parameters of different types, and both of which may be for controlling of the blades of the wind turbine. In other embodiments, the first pitch parameter and the second pitch parameter may be pitch parameters of the same type.

In step S130, an updated threshold is determined based on the obtained historical second pitch parameters.

Hereinafter, another method for determining an updated threshold based on an obtained historical second pitch parameters is described in detail in conjunction with FIG. 2.

Figure 2:
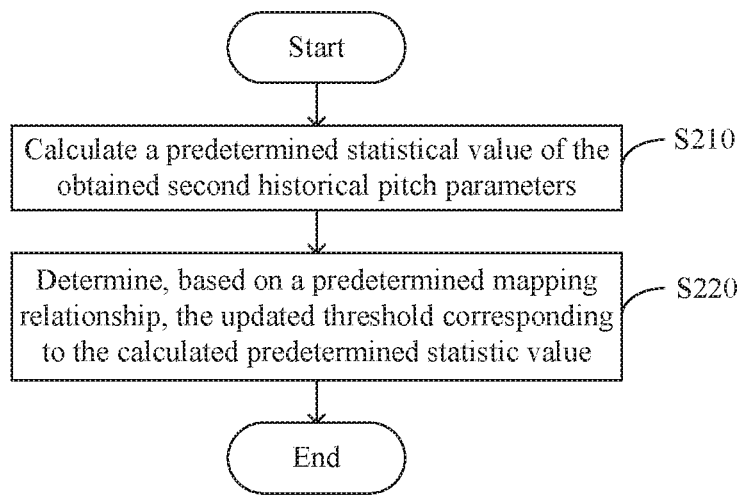
FIG. 2 is a flowchart of a method for determining an updated threshold based on an obtained historical pitch parameter according to an embodiment of the present disclosure.

FIG. 2 is a flowchart of a method for determining an updated threshold based on an obtained historical second pitch parameters according to an embodiment of the present disclosure, which includes steps S210 to S220.

In step S210, a predetermined statistical value of the obtained historical second pitch parameters is calculated.

The predetermined statistical value may be a statistical value for reflecting an overall condition of the historical pitch parameters in statistics. For example, the predetermined statistical value may be an average, a median, and the like, of the historical pitch parameters within the predetermined time period.

In step S220, the updated threshold corresponding to the calculated predetermined statistical value is determined based on a predetermined mapping relationship.

The mapping relationship represents a mapping between the predetermined statistical value of the second pitch parameters and the updated threshold. The updated threshold is to limit the value of the first pitch parameter. The mapping may be in a form of a mathematical function relationship, a curve graph, a data table, and any other form which may represent a mapping between the predetermined statistical value and the updated threshold. The present disclosure does not limit the form of the mapping.

Reference is further made to FIG. 1. In step S140, the first pitch parameter for the current time is compared with the determined updated threshold.

In step S150, the first pitch parameter for the current time is updated based on a result of the comparison.

In some embodiments, details in performing the step S150 relate to the type of the first pitch parameter and the type of the second pitch parameter.

A first example is taken, in which the first pitch parameter is a pitch angle and the second pitch parameter is a pitch rate, or both the first pitch parameter and the second pitch parameter are pitch rates. The first pitch parameter for the current time is not updated in a case that the first pitch parameter for the current time is greater than or equal to the updated threshold (for example, under the extreme turbulence wind condition), and the first pitch parameter for the current time is updated to be equal to the updated threshold, in a case that the first pitch parameter for the current time is smaller than the updated threshold.

A second example is taken, in which the first pitch parameter is a pitch rate and the second pitch parameter is a pitch angle, or both the first pitch parameter and the second pitch parameter are pitch angles. The first pitch parameter for the current time is not updated, in a case that the first pitch parameter for the current time is smaller than or equal to the updated threshold (for example, under the extreme turbulence wind condition), the first pitch parameter for the current time is updated to be equal to the updated threshold, in a case that the first pitch parameter for the current time is greater than the threshold.

By limiting a small pitch angle or a fast pitch rate caused by the extreme turbulence wind condition, based on the pitch parameter data under the normal turbulence wind condition, an issue that there is an excessive ultimate load on components of the wind turbine due to a quick pitch adjustment under the extreme turbulence wind condition is effectively avoided. Additionally, the normal pitch angle or the normal pitch rate is not limited by this method, so that the pitch adjustment operation performed under the normal turbulence wind condition is not affected.

Hereinafter, a method for establishing a predetermined mapping relationship is described in detail in conjunction with FIG. 3.

Figure 3:
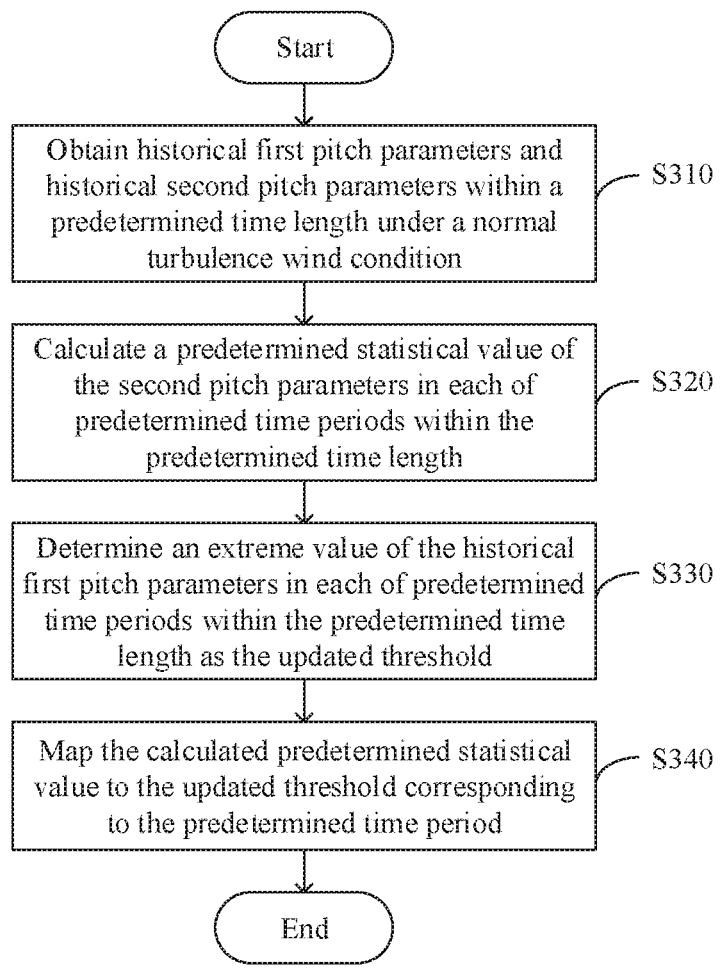
FIG. 3 is a flowchart of a method for establishing a predetermined mapping relationship according to an embodiment of the present disclosure.

FIG. 3 is a flowchart of a method for establishing a predetermined mapping relationship according to an embodiment of the present disclosure, which includes steps S310 to S340.

In step S310, historical first pitch parameters and historical second pitch parameters within a predetermined time length under a normal turbulence wind condition are obtained.

The predetermined time length may be greater than a time length of the predetermined time period described in FIG. 1. For example, in a case that the predetermined time period described in FIG. 1 is one minute, the predetermined time length may be one day. More abundant data can be acquired using a longer predetermined time length, and the mapping relationship determined by the method described in FIG. 3 is more accurate.

In step S320, a predetermined statistical value of the historical second pitch parameters in each of predetermined time periods within the predetermined time length is calculated.

It should be noted that the predetermined statistical value in the step S320 is of a same type as the predetermined statistical value described in FIG. 2. For example, when the predetermined statistical value described in FIG. 2 is an average, the predetermined statistical value described in the step S320 is also an average.

In step S330, an extreme value of the historical first pitch parameters in the each of predetermined time periods within the predetermined time length is determined as the updated threshold.

According to the method for establishing the predetermined mapping relationship described with reference to FIG. 3, besides determining the predetermined statistical value of the historical second pitch parameters in each of predetermined time periods within the predetermined time length in the step S320, it is further required to determine the updated threshold of the historical first pitch parameters in the each of predetermined time periods within the predetermined length of time. Herein the extreme value of the historical first pitch parameters is taken as the updated threshold.

The extreme value may include a maximum value and a minimum value. Whether the extreme value is the maximum value or the minimum value depends on the type of the first pitch parameter. For example, the extreme value is the minimum value in a case that the first pitch parameter is the pitch angle; and the extreme value is the maximum value, in a case that the first pitch parameter is the pitch rate.

In the step S340, the calculated predetermined statistical value is mapped to the updated threshold corresponding to the each of predetermined time periods.

As described with reference to FIG. 2, the mapping relationship between the predetermined statistical value and the updated threshold may be represented by using a mathematical function relationship, a curve graph, a data table, or the like, which is not limited in the present disclosure.

In some embodiments, in a case that the predetermined statistical values of the historical second pitch parameters in multiple predetermined time periods within the predetermined time length are a same predetermined statistical value, the step S340 further includes that the same predetermined statistical value is mapped to an extreme value of a set of the updated thresholds for the historical first pitch parameters in the multiple predetermined time periods. Namely, the identical statistical values are merged so that a single statistical value corresponds to a single updated threshold in a case that multiple statistical values obtained in the step S330 are identical.

Hereinafter an embodiment is described, where the first pitch parameter and the second pitch parameter are both pitch angles, and the same predetermined statistical value is mapped to the extreme value of the set of the updated thresholds for the historical first pitch parameters in the multiple predetermined time periods. Table 1 shows data obtained by calculating the predetermined statistical value and the updated threshold for the each of predetermined time periods.

TABLE 1

| Time period (min) | 0~1 | 1~2 | 2~3 | 3~4 | 4~5 | 5~6 | 6~7 | 7~8 | 8~9 |
|---|---|---|---|---|---|---|---|---|---|
| Predetermined statistical value (degrees) | 10 | 11 | 11 | 12 | 11 | 10 | 10 | 9 | 10 |
| Updated threshold (degrees) | 9.9 | 10.8 | 10.7 | 11.6 | 10.8 | 9.6 | 9.8 | 8.8 | 9.6 |

It can be seen from Table 1 that, there are identical statistical values after performing the steps S320 and S330. For example, there are four identical predetermined statistical values having a value of 10, and three identical predetermined statistical values having a value of 11.

The four identical predetermined statistical values corresponds to a set of updated thresholds with values of 9.9, 9.6, 9.8, and 9.6, respectively. In a case that the first pitch parameter and the second pitch parameter are both pitch angles, the extreme value of this set should take the minimum value 9.6. Based on this, the same predetermined statistical value (namely, 10 degrees) is mapped to the extreme value (namely, 9.6) of the set of the updated thresholds for the historical pitch parameters in the multiple predetermined time periods. By processing the three predetermined statistical values having identical values of 11 in a same manner, the mapping relationship in Table 1 can be converted into a mapping relationship in Table 2 as follows.

| | Predetermined statistical value (degrees) | | | |
|---|---|---|---|---|
| | 9 | 10 | 11 | 12 |
| Updated threshold (degrees) | 8.8 | 9.6 | 10.7 | 11.6 |

Hereinafter, an example in which the first pitch parameter is the pitch rate and the second pitch parameter is the pitch angle, is taken to describe a method for controlling a pitch of a wind turbine under an extreme turbulence wind condition according to an embodiment of the present disclosure.

First, a relationship between the pitch angle (the second pitch parameter) and the pitch rate (the first pitch parameter) under the normal turbulence wind condition is established, so that the pitch rate is not limited under the normal turbulence wind condition while the pitch rate is limited under the extreme turbulence wind condition. Thereby, the issue of an excessive load caused by a quick pitch adjustment is prevented.

For example, the wind is determined as a normal turbulence wind is determined based on a standard deviation of rotational speed or wind speed signal within the predetermined time length (for example, ten hours or one week), and then an average of the pitch angle in each of predetermined time periods (for example, 1 minute or 1 hour) and a maximum value of the pitch rate within the corresponding predetermined time period are calculated. A relationship between the average and the maximum value is established by using statistical or other manners. This relationship is regarded as a relationship between the pitch angle and the maximum value of the pitch rate.

Then, the average of the pitch angle in the predetermined time period during which the wind turbine operates is taken as an input. A maximum value of the pitch rate for a current moment is obtained by using the relationship, and the pitch rate is limited to be increased suddenly to a great value (namely, greater than the maximum value). Thereby, the load under an extreme wind speed is reduced.

Figure 4:
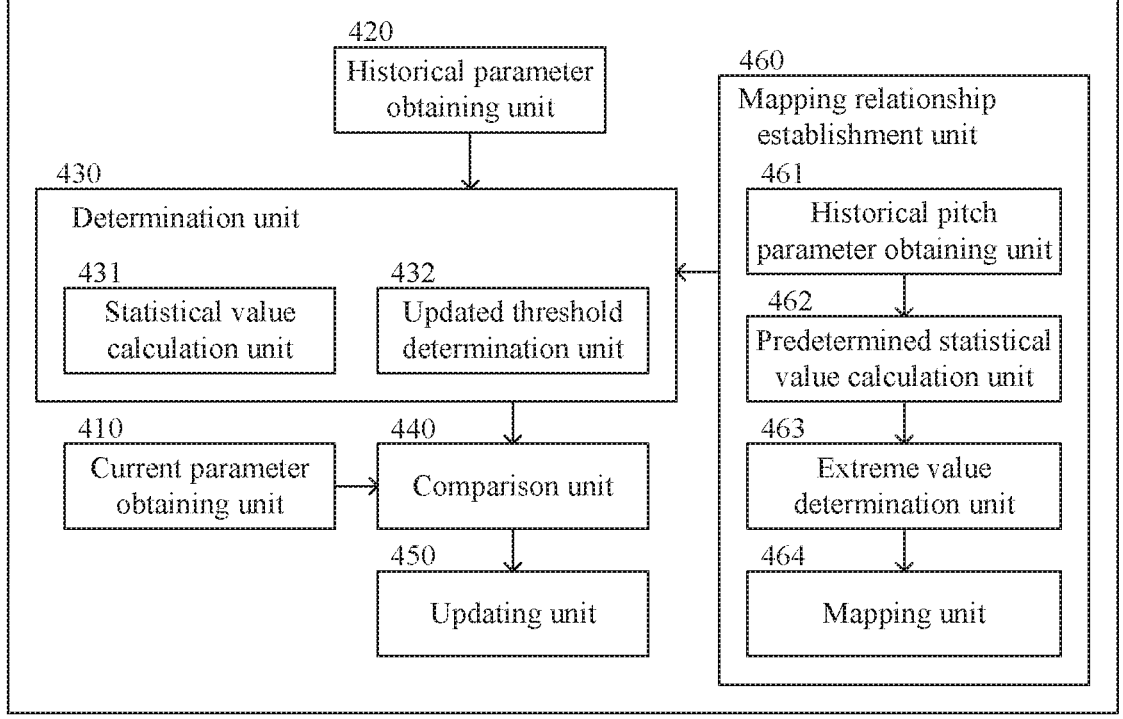
FIG. 4 is a block diagram of an apparatus for controlling a pitch of a wind turbine according to an embodiment of the present disclosure.

FIG. 4 is a block diagram of an apparatus 800 for controlling a pitch of a wind turbine under an extreme turbulence wind condition according to an embodiment of the present disclosure.

The apparatus 400 for controlling the pitch of the wind turbine includes a current parameter obtaining unit 410, a historical parameter obtaining unit 420, a determination unit 430, a comparison unit 440, and an updating unit 450.

The current parameter obtaining unit 410 obtains a first pitch parameter for the current time.

The historical parameter obtaining unit 420 obtains historical second pitch parameters in a predetermined time period before the current time.

In one embodiment, the first pitch parameter and the second pitch parameter are pitch parameters of different types, and both may be for controlling blades of a wind turbine.

In another embodiment, the first pitch parameter and the second pitch parameter may be pitch parameters of the same type.

The determination unit 430 determines an updated threshold based on the obtained historical second pitch parameters.

The determination unit 430 includes a statistical value calculation unit 431 and an updated threshold determination unit 432. The statistical value calculation unit 431 calculates a predetermined statistical value of the obtained historical second pitch parameters. The predetermined statistical value may be a statistical value for reflecting an overall condition of the historical pitch parameters in statistics. For example, the predetermined statistical value may be an average, a median, and the like, of the historical pitch parameters in the predetermined time period.

The updated threshold determination unit 432 determines an updated threshold corresponding to the calculated predetermined statistical value, based on a predetermined mapping relationship. The mapping relationship represents a mapping between the predetermined statistical value of the second pitch parameters and the updated threshold. The updated threshold is to limit the value of the first pitch parameter. The mapping may be in a form of a mathematical function relationship, a curve graph, a data table, and other forms which may represent the mapping between the predetermined statistical value and the updated threshold. The present disclosure does not limit the form of the mapping.

The comparison unit 440 compares the first pitch parameter for the current time with the determined updated threshold.

The updating unit 450 updates the first pitch parameter for the current time, based on a result of the comparison unit.

Herein, detailed operations performed by the updating unit 450 relate to the types of the first pitch parameter and the types of the second pitch parameter.

A first example is taken, in which the first pitch parameter is a pitch angle and the second pitch parameter is a pitch rate, or both the first pitch parameter and the second pitch parameter are pitch rates. The updating unit 450 does not update the pitch parameter for the current time, in a case that the first pitch parameter for the current time is greater than or equal to the updated threshold (for example, under the extreme turbulence wind condition); and the updating 450 updates the current pitch to be equal to the updated threshold, in a case that the first pitch parameter for the current time is smaller than the updated threshold.

A second example is taken, in which the first pitch parameter is a pitch rate and the second pitch parameter is a pitch angle, or both the first pitch parameter and the second pitch parameter are pitch angles. The updating unit 450 updates the first pitch parameter for the current time, in a case that the first pitch parameter for the current time is smaller than or equal to the updated threshold (for example, under the extreme turbulence wind condition); and the updating unit 450 updates the first pitch parameter for the current time to equal the updated threshold in a case that the first pitch parameter for the current time is greater than the threshold.

By limiting a small pitch angle or a fast pitch rate caused by the extreme turbulence wind condition, based on the pitch parameter data under the normal turbulence wind condition, an issue that there is an excessive ultimate load on components of the wind turbine due to a quick pitch adjustment under the extreme turbulence wind condition is effectively avoided. Additionally, the normal pitch angle or the normal pitch rate is not limited by this method, so that the pitch adjustment operation performed under the normal turbulence wind condition is not affected.

In some embodiments, the apparatus 400 for controlling the pitch of the wind turbine further includes a mapping relationship establishment unit 460.

The mapping relationship establishment unit 460 establishes a predetermined mapping relationship.

The mapping relationship establishment unit 460 includes a historical pitch parameter obtaining unit 461, a predetermined statistical value calculation unit 462, an extreme value determination unit 463, and a mapping unit 464.

The historical pitch parameter obtaining unit 461 obtains historical first pitch parameters and historical second pitch parameters within a predetermined time length under a normal turbulence wind condition.

The predetermined statistical value calculation unit 462 calculates the predetermined statistical value of the history second pitch parameters in each of predetermined time periods within the predetermined time length.

The extreme value determination unit 463 determines an extreme value of the historical first pitch parameters in the each of predetermined time periods within the predetermined time length as the updated threshold.

The extreme value may include a maximum value and a minimum value. Whether the extreme value is the maximum value or the minimum value depends on the type of the first pitch parameter. For example, the extreme value is the minimum value in a case that the first pitch parameter is the pitch angle, or the extreme value is the maximum value, in a case that the first pitch parameter is the pitch rate.

The mapping unit 464 maps the calculated predetermined statistical value to the updated threshold corresponding to the each of predetermined time periods.

The mapping relationship between the predetermined statistical value and the updated threshold may be represented by using a mathematical function relationship, a curve graph, a data table, or the like, which is not limited in the present disclosure.

In some embodiments, in a case that the predetermined statistical values of the historical second pitch parameters in multiple predetermined time periods within the predetermined time length are a same predetermined statistical value, the mapping relationship establishment unit 460 maps the same predetermined statistical value to an extreme value of a set of the updated thresholds for the historical first pitch parameters in multiple predetermined time periods. Namely, the mapping relationship establishment unit 460 merges the identical statistical values so that a single statistical value corresponds to a single updated threshold in a case that multiple statistical values obtained by the predetermined statistical value calculation unit 462 are identical.

Hereinafter referring to FIG. 5, technical effects of the method for controlling the pitch of the wind turbine is described.

Figure 5:
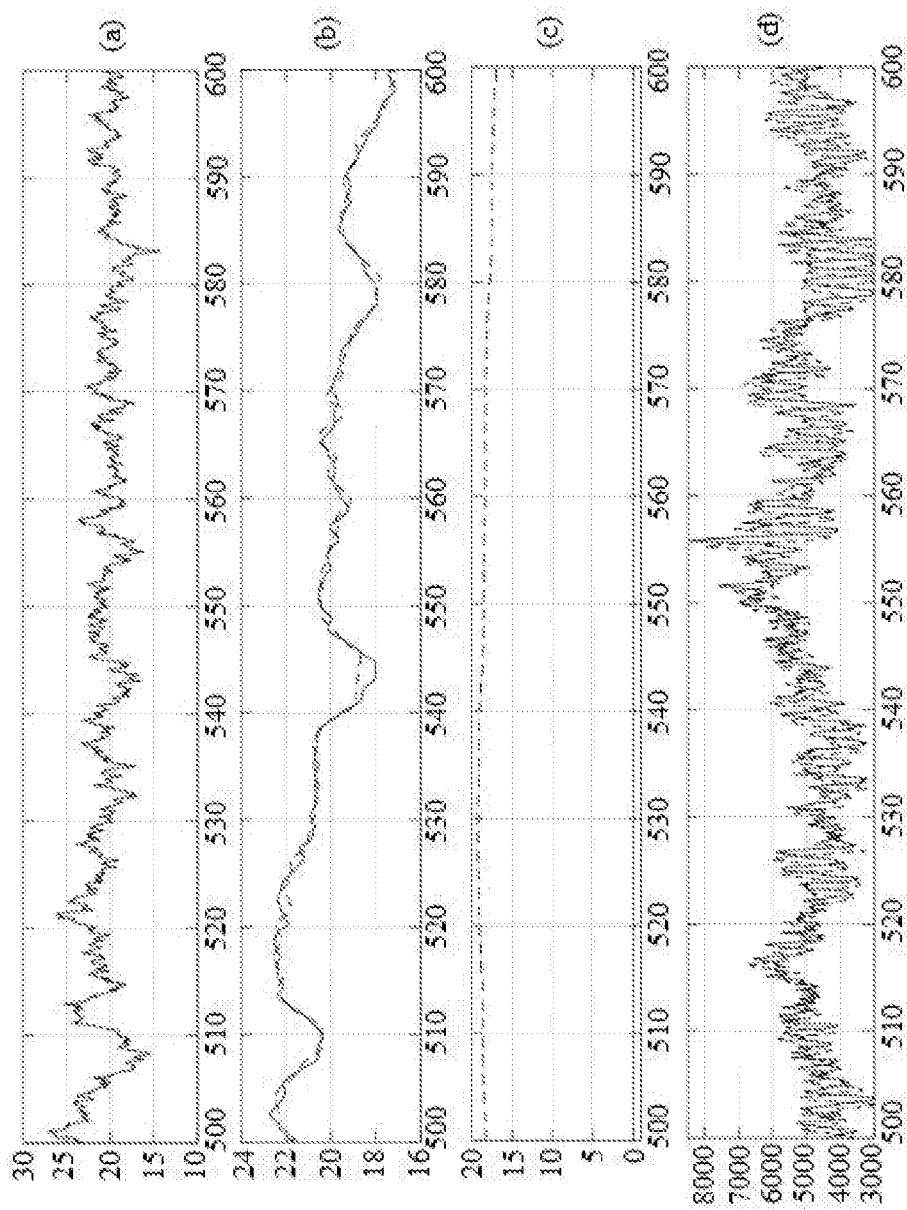
FIG. 5 is a curve graph of a method for controlling a pitch of a wind turbine according to an embodiment of the present disclosure.

FIG. 5 is a curve graph of a method for controlling the pitch of the wind turbine according to an embodiment of the present disclosure.

Referring to FIG. 5 which is an embodiment of the present disclosure, the curve graph illustrates a simulation result of a timing sequence of pitch control of the wind turbine, under an extreme turbulence wind condition with an average wind speed of 19 m/s, in which the first pitch parameter and the second pitch parameter are both pitch angles. All horizontal axis in FIG. 5 represents time (s). Subfigure (a) of FIG. 5 shows the wind speed (m/s) versus time under an extreme turbulence wind condition. Subfigure (b) of FIG. 5 shows the pitch angle (degree) of the wind turbine versus time. Subfigure (c) shows of FIG. 5 the extreme value (namely, a minimum value) of the pitch angle (degree) versus time. Subfigure (d) shows load (kN/m) on the top of the wind turbine versus time. In FIG. 5, a solid line represents data without using the method for controlling the pitch of the wind turbine according to an embodiment of the present embodiment. A dot-dash line represents data using the method for controlling the pitch of the wind turbine according to an embodiment of the present embodiment.

As shown in FIG. 5, it can be found that the extreme value (namely, a minimum value) of the pitch angle changes at every moment (referring to subfigure (c) of FIG. 5) using the method for controlling the pitch of the wind turbine according to an embodiment of the present disclosure. In subfigure (b) of FIG. 5, when the pitch angle obtained by a conventional method becomes too small, the method for controlling the pitch of the wind turbine according to the embodiment of the present disclosure can limit such a variation of the pitch angle. Therefore, the pitch angle is prevented from becoming too small, so that the pitch angle does not change extremely. For example, in a time interval from 540 s to 546 s, the pitch angle obtained by the method for controlling the pitch of the wind turbine according to an embodiment of the present disclosure is significantly larger than the pitch angle obtained without using this method. It can be seen from subfigure (d) of FIG. 5 that, the load on the top of the wind turbine reaches a maximum value at 550 s to 560 s without using the method for controlling the pitch of the wind turbine according to an embodiment of the present disclosure. In contrast, the pitch angle does not change extremely, and therefore the pitch adjustment operation is relatively smooth when using the method for controlling the pitch of the wind turbine according to an embodiment of the present disclosure. Thereby, an extreme value of the load in 550 s to 560 s is significantly smaller than a case without using the method for controlling the pitch of the wind turbine according to an embodiment of the present disclosure.

In some embodiments, a computer readable medium may include a computer program which, when being executed, makes the apparatus perform at least a part of the method steps as described above. In some embodiments, the computer readable medium may be included in a magnetic medium, an optical medium, other mediums, or a combination thereof (for example, a CD-ROM, a hard drive, a read only memory, and a flash drive). In such embodiment, the computer readable medium is a tangible and non-transitory product.

According to the method, the apparatus and the system for controlling the pitch of the wind turbine according to the present disclosure, the determination whether there is an extreme turbulence is not required. Therefore, a serious power loss caused by the inaccurate determination is avoided. An issue that there is an excessive ultimate load on components of the wind turbine due to a quick pitch adjustment under the extreme turbulence wind condition is effectively avoided, without influencing a pitch adjustment operation performed under a normal turbulence wind condition. A development cost of the wind turbine is reduced as well.

The invention claimed is:

1. A computer-implemented method for controlling a pitch of a wind turbine under an extreme turbulence wind condition, comprising:
   obtaining, by a processor, a first pitch parameter for a current time;
   obtaining, by the processor, historical second pitch parameters in a first predetermined time period before the current time;
   determining, by the processor, an updated threshold based on the obtained historical second pitch parameters;
   comparing, by the processor, the first pitch parameter for the current time with the determined updated threshold;
   updating, by the processor, the first pitch parameter for the current time based on a result of the comparison; and
   controlling, by the processor, the pitch of the wind turbine according to the updated first pitch parameter;
   wherein determining the updated threshold based on the obtained historical second pitch parameters comprises:
      calculating a statistical value of the obtained historical second pitch parameters in the first predetermined time period; and
      determining, based on a mapping relationship, the updated threshold corresponding to the calculated statistical value;
   wherein the method further comprises establishing the mapping relationship before determining the updated threshold corresponding to the calculated statistical value; and
   wherein establishing the mapping relationship comprises:
      obtaining historical first pitch parameters and historical second pitch parameters in each of a plurality of second predetermined time periods, within a predetermined time length, under a normal turbulence wind condition; and
      for each of the plurality of second predetermined time periods,
         calculating a statistical value of the historical second pitch parameters in the second predetermined time period;
         determining an extreme value of the historical first pitch parameters in the second predetermined time period as an updated threshold corresponding to the second predetermined time period; and
         mapping the calculated statistical value of the historical second pitch parameters in the second predetermined time period to the updated threshold corresponding to the second predetermined time period to establish the mapping relationship.

2. The method according to claim 1, wherein in a case that the statistical value of the historical second pitch parameters in more than one of the plurality of second predetermined time periods within the predetermined time length is an identical statistical value:
   the identical statistical value is mapped to an extreme value of a set of the updated thresholds for the historical first pitch parameters in the more than one of the plurality of second predetermined time periods.

3. The method according to claim 1, wherein the extreme value is a minimum value in a case that the first pitch parameter is a pitch angle, and the extreme value is a maximum value in a case that the first pitch parameter is a pitch rate.

4. The method according to claim 1, wherein the statistical value is an average.

5. The method according to claim 1, wherein:
updating the first pitch parameter for the current time based on the result of the comparison in a case that the first pitch parameter is a pitch angle and the second pitch parameter is a pitch rate, comprises:
not updating the first pitch parameter for the current time, in a case that the first pitch parameter for the current time is greater than or equal to the updated threshold; and
updating the first pitch parameter for the current time so that the first pitch parameter is equal to the updated threshold, in a case that the first pitch parameter for the current time is smaller than the updated threshold.

6. The method according to claim 1, wherein a type of the first pitch parameter and a type of each of the historical second pitch parameters are identical or different.

7. An apparatus for controlling a pitch of a wind turbine under an extreme turbulence wind condition, comprising:
a current parameter obtaining unit, configured to obtain a first pitch parameter for a current time;
a historical parameter obtaining unit, configured to obtain historical second pitch parameters in a first predetermined time period before the current time;
a determination unit, configured to determine an updated threshold based on the obtained historical second pitch parameters;
a comparison unit, configured to compare the first pitch parameter for the current time with the determined updated threshold;
an updating unit, configured to update the first pitch parameter for the current time based on a result of the comparison unit; and
a control unit, configured to control the pitch of the wind turbine according to the updated first pitch parameter;
wherein the determination unit comprises:
a statistical value calculation unit, configured to calculate a statistical value of the obtained historical second pitch parameters in the first predetermined time period; and
an updated threshold determination unit, configured to determine, based on a mapping relationship, the updated threshold corresponding to the calculated statistical value;
wherein the apparatus further comprises a mapping relationship establishment unit, configured to establish the mapping relationship before the updated threshold determination unit determines the updated threshold corresponding to the calculated statistical value; and
wherein the mapping relationship establishment unit is configured to:
obtain historical first pitch parameters and historical second pitch parameters in each of a plurality of second predetermined time periods, within a predetermined time length, under a normal turbulence wind condition; and
for each of the plurality of second predetermined time periods,
calculate a statistical value of the historical second pitch parameters in the second predetermined time period;
determine an extreme value of the historical first pitch parameters in the second predetermined time period as an updated threshold corresponding to the second predetermined time period; and
map the calculated statistical value of the historical second pitch parameters in the second predetermined time period to the updated threshold corresponding to the second predetermined time period to establish the mapping relationship.

8. The apparatus according to claim 7, wherein in a case that the statistical value of the historical second pitch parameters in more the one of a plurality of second predetermined time periods within the predetermined time length is an identical statistical value,
the identical statistical value is mapped to an extreme value of a set of the updated thresholds for the historical first pitch parameters in the more than one of the plurality of second predetermined time periods.

9. The apparatus according to claim 7, wherein the extreme value is a minimum value in a case that the first pitch parameter is a pitch angle, and the extreme value is a maximum value in a case that the first pitch parameter is a pitch rate.

10. The apparatus according to claim 7, wherein the statistical value is an average.

11. The apparatus according to claim 7, wherein:
to update the first pitch parameter for the current time based on the result of the comparison unit in a case that the first pitch parameter is a pitch angle and each of the historical second pitch parameters is a pitch rate, the apparatus further performs the following operations:
not updating the first pitch parameter for the current time, in a case that the first pitch parameter is greater than or equal to the updated threshold; and
updating the first pitch parameter for the current time so that the first pitch parameter is equal to the updated threshold, in a case that the first pitch parameter for the current time is smaller than the updated threshold.

12. The apparatus according to claim 7, wherein a type of the first pitch parameter and a type of each of the historical second pitch parameters are identical or different.

13. A system for controlling a pitch of a wind turbine under an extreme turbulence wind condition, comprising:
a processor; and
a non-transitory memory storing a computer program, wherein the computer program, when being executed by the processor, causes the processor to perform the method according to claim 1.

14. A non-transitory computer-readable storage medium storing a computer program, wherein the computer program, when being executed, is for performing the method according to claim 1.

15. The method according to claim 1, wherein:
updating the first pitch parameter for the current time based on the result of the comparison in a case that the first pitch parameter is a pitch rate and each of the historical second pitch parameters is a pitch angle, comprises:
not updating the first pitch parameter for the current time, in a case that the first pitch parameter for the current time is smaller than or equal to the updated threshold; and
updating the first pitch parameter for the current time so that the first pitch parameter is equal to the updated threshold, in a case that the first pitch parameter for the current time is greater than the updated threshold.

16. The apparatus according to claim 7, wherein:
to update the first pitch parameter for the current time based on the result of the comparison unit in a case that the first pitch parameter is a pitch rate and each of the historical second pitch parameters is a pitch angle, the apparatus further performs the following operations:

not updating the first pitch parameter for the current time, in a case that the first pitch parameter for the current time is smaller than or equal to the updated threshold; and updating the first pitch parameter for the current time so that the first pitch parameter is equal to the updated threshold, in a case that the first pitch parameter for the current time is greater than the updated threshold.

* * * * *